Figure 1:
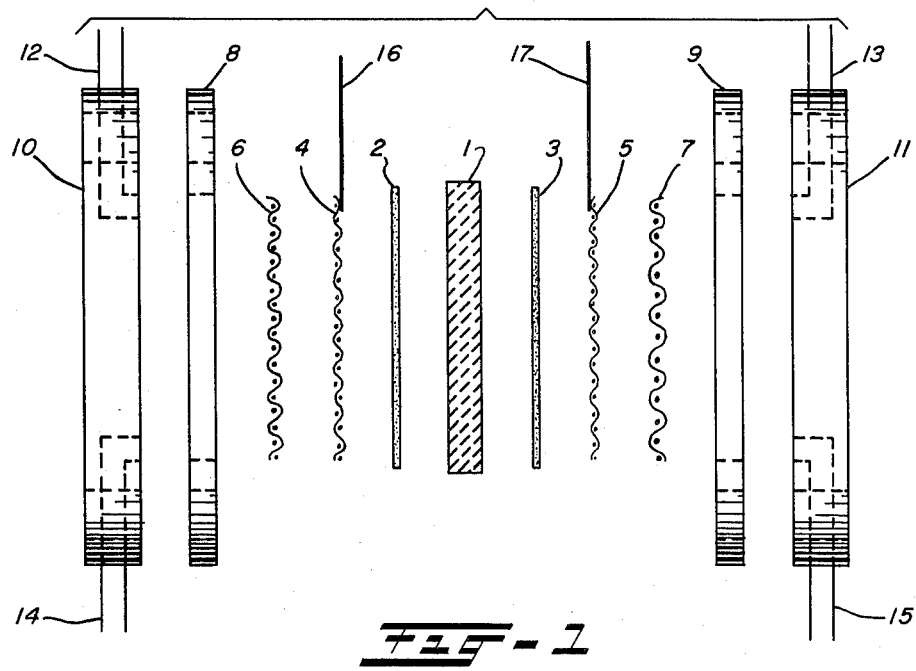

May 24, 1966 S. H. LANGER ETAL 3,252,839
NOVEL PLATINIZED ELECTRODES FOR FUEL CELLS AND FUEL
CELLS CONTAINING THE SAME
Filed Aug. 28, 1962

INVENTORS.
Stanley H. Langer
Henry P. Landi
BY
John E. Hanneken
ATTORNEY

United States Patent Office 3,252,839
Patented May 24, 1966

3,252,839
NOVEL PLATINIZED ELECTRODES FOR FUEL CELLS AND FUEL CELLS CONTAINING THE SAME
Stanley H. Langer, Stamford, Conn., and Henry P. Landi, Peekskill, N.Y., assignors to American Cyanamid Company, Stamford, Conn., a corporation of Maine
Filed Aug. 28, 1962, Ser. No. 219,916
12 Claims. (Cl. 136—86)

This invention relates to catalytic electrodes for fuel cells. More particularly, it relates to formed carbon catalytic electrodes employing platinum metals as the catalytic metal.

Formed carbon electrodes containing platinum metal are known for various applications, including use in fuel cells such as hydrogen-oxygen fuel cells. Such electrodes typically contain relatively large amounts of platinum metal, sometimes as much as 50% or more by weight of the metal. In preparing such electrodes, the catalytic metal, such as platinum black, is often mixed with carbon black and a binder, which frequently is also a waterproofing agent or an agent to prevent flooding of the electrode in use. The catalyst may also be deposited on the carbon by chemical means. Such a composition is then molded into a formed mass and incorporated into a fuel cell.

In addition to platinum metal-carbon electrodes of the type described above, electrodes formed entirely from platinum black are also commonly employed in fuel cells.

Platinum metals are for the most part very expensive. This is particularly true of platinum itself and, to a lesser degree, to palladium. Accordingly, any method of decreasing the amount of such materials required for use in electrodes without reducing the efficiency of the electrode or, even while improving such efficiency, would be a very important advance. Further, of course, any method of employing conventional amounts of such metal in a manner that produces a superior and even more efficient electrode than those previously known is also an important advance.

Accordingly it is an object of this invention to provide an electrode of the type suitable for use in fuel cells which is comparable to or superior to those employing significantly larger amount of catalytic metals and in fact are comparable to or superior to electrodes composed entirely of catalytic metal.

It is a further object of this invention to provide an electrode of the type suitable for use in fuel cells which distributes or employs catalytic metal in a more effective manner than those known with the result that for a given metal content a superior electrode is provided.

A further object is to provide a process for preparing such electrodes while a still further object relates to improved fuel cells containing such electrodes.

In general, all fuel cells contain what hereinafter will be referred to as "a catalyst system." By the use of this term "a catalyst system" and "catalyst system" it is meant the following three elements: an electrolyte, electrocatalysts and current collectors. Suitable collectors may be screens or perforated or corrugated plates and their equivalents.

In a typical fuel cell of the type generally contemplated in the following description, the electrolyte is constituted by a base or acid-containing film or member such as paper or a suitable ion exchange membrane. It may also be in the form of free electrolyte. Normally, a catalyst layer is positioned on either side of the electrolyte and the current collectors are positioned on top or at the outside of the catalyst layer of the electrocatalyst, as it will sometimes be referred to hereinafter. As is well known, these collectors normally facilitate removal of electrons from the anode electrocatalyst layer and introduction to the cathode electrocatalyst layer. An electrocatalyst layer and current collector may be considered together as a catalytic electrode assembly.

In a typical hydrogen-oxygen fuel cell or hydrogen-air fuel cell, the sites at which the electrochemical reaction occur, i.e., $H_2 \rightarrow 2H^+ + 2e$ at the anode, and $\frac{1}{2}O_2 + H_2O + 2e \rightarrow 2OH^-$ at the cathode are commonly thought to be positions in the electrocatalyst layer involving the three phase contact of reactant gas, catalyst and electrolyte. The electrolyte is thought to penetrate the electrocatalyst layer to various degrees depending on its structure and extent of waterproofing.

When platinum, such as platinum black or large concentrations of supported chemically reduced platinum compounds or other metallic platinum, is used as electrocatalyst, a large number of active sites are always available for the electrochemical process so that performance is excellent and extremely stable over a wide range of conditions such as electrolyte concentration, degree of water penetration into the electrocatalyst layer, and the like. Actually, a relatively small part of the total active sites of such catalysts are involved in electrochemical reaction under any given conditions.

It is the electrocatalyst or electrode, as it is sometimes referred to, that the present invention is directed primarily to and to improved fuel cells containing such electrodes.

In accordance with the present invention, an electrode comprising a formed porous carbon mass and having a binder-waterproofing agent is provided, which has electrodeposited on said waterproofed formed carbon mass catalytic amounts of a platinum metal.

The formed porous carbon mass may be of any suitable size and shape useful as electrodes in the preparation of fuel cells. The carbon to be employed in the electrode may be derived from virtually any source, such as the destructive distillation of wood, or it may be derived from coal or petroleum sources. Suitable carbons include lamp blacks, graphites and other such materials known to be useful as supports for catalytic elements for various applications, including fuel cells. Preferably, the carbon should be chemically inert under prevailing electrolyte conditions.

The formed porous carbon mass should have incorporated therewith from about 1 to 50% of a binder-waterproofing agent. Preferably, the amount of binder-waterproofing agent is from between 3 and 30%. By binder-waterproofing agent, as that term is employed herein, it is meant a material which would assist in the molding or forming of the carbon into a predetermined formed mass and in addition a material which would prevent the flooding of catalytic sites by the presence of fluids such as water, which normally forms in controlled amounts in hydrogen-oxygen or hydrogen-air fuel cells. Suitable binder-waterproofing agents include polytetrafluoroethylene, polyethylene, wax, such as petroleum waxes, Carnauba waxes and the like, and chloro-trifluoroethylene.

By the term "porous," as it is employed herein in reference to the electrodes, it is meant that there is large surface area contact between gas, solid and liquid phases in the electrode and gas diffusing into the electrode has ready access to the liquid phase.

The waterproofed formed carbon mass, which may or may not contain catalytic metals in catalytic amounts, such as a platinum metal, then has a catalytic metal electrodeposited thereon. This is the key and singly most important aspect of the present invention, in that it is by this procedure that applicants have found that relatively minor amounts of electrodeposited material on a waterproofed formed carbon mass greatly improves the current density of the electrode relative to the amount of catalytic metal employed. It is believed that the surprising advantage arises from the fact that these metals position themselves only on the sites accessible to electrolyte. It will be apparent that catalytically active sites on the waterproofed mass must be accessible to both gas and electrolyte. It is thought that waterproofing does to some extent interfere with catalytic activity and that, by first forming the carbon mass so that it is waterproofed prior to electrodeposition, minor amounts of costly catalytic metals are employed with remarkable efficiency. A major advantage is that coverage of active material by the bonding or waterproofing agent is minimized. While evidence to date would appear to support the above interpretation of the remarkable effects achieved by the practice of this invention, applicants do not wish to be bound thereby.

The electrodes of this invention may have from 0.001% up to about 20% of catalytic metal, electrodeposited thereon, though preferably the amount is from 0.1 to about 10%. As noted above, the carbon itself may have incorporated therein substantial amounts of the same or different catalytic metal and thus may contain from between about .1% up to about 40% and preferably from about .5 to 10% of such catalytic metals. It will be appreciated that all of the figures recited above refer to platinum metals or metals of the platinum series and in particular to platinum, palladium or ruthenium, and that same variation in the amounts will be recorded for different suitable metals in the series.

With regard to catalytic metals, it should be noted that while reference hereinabove and hereinafter is directed primarily to platinum as the most commonly available and catalytically useful metal, other members of the platinum metal series such as palladium are contemplated for use in accordance with this invention. Further, other Group VIII metal such as nickel, cobalt and the like and Group I(b) elements such as copper, silver, gold and the like may be employed.

Figure 2:
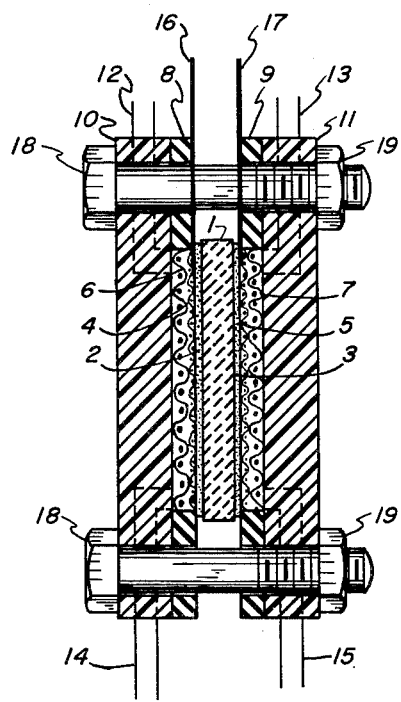

As an aid to understanding the present invention, reference is made herein to the accompanying drawing in which:

FIG. 1 is an exploded plan view partially in section of a fuel cell of the type employed in the present invention; and FIG. 2 is partially expanded side view partially in section, of the fuel cell shown in FIG. 1.

In accordance with the figures, an acidic or basic electrolyte membrane 1 constituted by filter paper saturated with an acidic or basic material such as sulfuric acid or potassium hydroxide or an ion exchange membrane is positioned between porous catalytic electrodes 2 and 3. Positioned to the outside of the porous catalytic electrodes are current collector screens 4 and 5, which may be of stainless steel screen or other suitable inert metal. Stainless steel wire mesh spacers 6 and 7 are used to press the collector screens against the electrodes providing better contact between screen and electrode as well as electrode and membrane and are positioned to the outside of the current collectors. To the outside of the spacers are gaskets 8 and 9 of suitable materials such as silicone rubber gaskets, which function to seal as well as separate the chambers containing reactants. It will be appreciated that in operation the cell of FIG. 2 is compressed until the gaskets form a seal. To the outside of the gaskets are housing members 10 and 11 having inlet stainless steel tubing 12 and 13 through which hydrogen and oxygen are introduced respectively into the fuel cells. Stainless steel tubing 14 and 15 provides the vents for unused gaseous fuel. Wire leads 16 and 17, connected onto current collector screens 4 and 5 respectively, are the conductive members through which current flows from the fuel cell when the latter is in operation. The cell is held together, as for example by bolts 18 and nuts 19.

In order to illustrate the present invention, the following examples are given primarily by way of illustration. No specific details or enumerations contained therein should be construed as limitations on the present invention except insofar as they appear in the appended claims.

In carrying out the comparative tests reported in Examples 1 through 4 below, the following procedures were employed.

PREPARATION OF MOLDED POROUS CATALYTIC ELECTRODE

In the molding procedure employed, the required amounts of catalytic powder (or a thoroughly mixed blend) was combined with an appropriate amount of polytetrafluoroethylene suspension and water to form a slurry. The mixture was spread over the desired area and allowed to dry in a forced air oven. When cracks or pinholes formed, the material was spread out again before molding.

A typical formulation for a 2¾ inch square carbon electrode sheet approximately 7 mils thick employed in the examples is as follows:

1.3 g. carbon
1.6 ml. distilled water
0.24 ml. of a tetrafluoroethylene suspension containing 10–25% polymer solids based on the amount of catalyst powder Platinum metal powders or platinum chemically deposited on carbon was substituted for the carbon as indicated in the examples following.

Aulminum foil with polished wax surface was used to provide release from the mold or caul plates, sprayed with silicone release agent in order to provide more ready release of the molded article.

Molding conditions for sintering and fusing the mixture was 10 minutes at 325–350° C. at 200 to 1000 p.s.i. pressure. The mold was removed from the heated press and allowed to cool under contact pressure in a second press.

Materials such as platinum screen or other fine mesh wire screens may also be used as substrates or carriers for porous catalytic electrode mixtures. These are impregnated with the slurry and treated by procedures similar to those above.

In order to insure maximum contact of electrolyte with the hydrophobic molded electrode, it is often desirable to remove wax and silicone grease incorporated into the molding process. The dry electrode was soaked for 10 minutes or more with trichloroethylene to remove wax and then soaked in denatured alcohol to remove the trichloroethylene. This procedure was followed by soaking the molded electrodes in alkali solutions to remove silicone grease and subsequently washed to remove residual alkali such as potassium hydroxide. When the electrode was to be used with acid electrolyte, the electrode was washed with 0.1 normal sulfuric acid to insure removal of base. This treatment with sulfuric acid also produces a beneficial effect.

A specially prepared polyethylene holder for platinization of the shaped, often fragile, molded electrodes was prepared. Platinization of these electrodes was performed with a counter platinum electrode at currents of 200 to 400 milliamperes with a commercial 3 to 5% chloroplatinic acid solution containing 0.01% to 0.03% lead acetate. This platinization was performed under reproducible conditions. A typical ten-minute platinization resulted in a deposition of 0.08 gm. on an electrode of 6.3 cm.$^2$ with exposed area of 5.9 cm.$^2$. Platinum is deposited on both sides of the electrode and within the interior of the electrode, but the major portion of the platinum is deposited on that portion of the electrode facing the counter electrode during electrodeposition. It will be shown later (Example 4) that the platinum deposited within the interior of the electrode tends to be most catalytically effective. It is believed that this would be true with electrodes of thickness of 1 to about 20 mils. At the thin end of the range externally located platinum would become increasingly catalytically effective. The amount of electrodeposited platinum was normally checked by weighing. Because electrodeposition was performed under reproducible conditions, the amount of platinum deposited could also be estimated.

The electrodes were cut only slightly larger than the inside diameter of the silicone rubber gasket which compressed them against the electrolyte.

FIG. 1 illustrates the fuel cell employed in the experiments hereinafter. The inlet and outlet stainless steel tubing was seated in the face plates with a trichloroethylene solution of polystyrene. The cell structure was held together with 3/16" stainless steel bolts.

The current collectors were fabricated from platinum screen, 45 mesh with 0.0078" wire. Electrical contact was made to the current collectors with wires woven into the screen. Stainless steel screen spacers were prepared from 10 and 20 mesh screen, 0.025 and 0.015" wire. Both spacers and current collectors were cut to fit the inside diameter of the silicon rubber gasket, 4.9 cm.$^2$, and were inserted into the cell assembly.

In all examples that follow, the same or similar platinum black-polytetrafluoroethylene electrodes are used as standard oxygen electrodes. These electrodes contain from 0.19 to 0.25 gram of platinum.

Example 1

In this example a series of electrodes prepared employing the procedures set forth above were compared in a hydrogen-oxygen fuel cell of the type shown in FIG. 1 in which the electrolyte was a filter paper saturated with 2 normal sulfuric acid. The compositions of electrodes A, B, C and D including weight of platinum metal are as follows:

(A) Platinum black $O_2$ electrode; platinum black $H_2$ electrode; 0.24 gm. of Pt each electrode
(B) Platinum black $O_2$ electrode—0.24 gm. of platinum; carbon—5% platinum black $H_2$ electrode—8.9 milligrams of platinum
(C) Platinum black $O_2$ electrode—0.24 gm. of platinum; carbon—5% platinum black platinized 3 minutes $H_2$ electrode—37.6 milligrams of platinum
(D) Platinum black $O_2$ electrode—0.24 gm. of platinum; carbon—5% platinum black platinized 5 minutes $H_2$ electrode—54.6 miligrams of platinum.

In comparing these electrodes and the effect of electrodeposited platinum black on the performance of porous carbon platinum black electrodes, the results in terms of current density at 0.7 volt are recorded in Table I hereinbelow.

TABLE I

| Electrodes: | Current density (ma./cm.$^2$) @ .7 volt [1] |
|---|---|
| A | 71 |
| B | 43 |
| C | 73 |
| D | 71 |

[1] Corrected for IR drop. (Voltage loss due to internal resistance of the cell.)

0.7 volt represents a practical operating potential useful for comparative purposes, in view of the fact that the initial voltage is usually between 1 and 1.1 volts, and upon drawing current from the cell operating voltage is diminished.

Example 1 demonstrates that electrode C, an electrode prepared in accordance with this invention is as good as or even slightly superior as a hydrogen electrode when compared with a cell system employing platinum black as both the hydrogen and oxygen electrode (A). Table I further demonstrates that lengthy platinizations appear to have an adverse effect on the current densities in the fuel cell.

Example 2

A series of four electrodes were prepared employing the general procedure set forth hereinabove except that the original platinum-carbon electrode contained 3% by weight of platinum. The electrolyte was a filter paper impregnated with 2 N sulfuric acid. The original electrode weighed about 0.15 gram and contained originally approximately 0.6 milligram of platinum per cm.$^2$. For C, 1.6 mgm./cm.$^2$ of platinum was deposited on the electrode and for D, 5.1 mgm./cm.$^2$ was electrodeposited.

The compositions of these electrodes are set forth below.

(A) Platinum black $O_2$ electrode—0.24 gm. of platinum; carbon—3% unplatinized platinum black $H_2$ electrode—3.8 milligrams of platinum
(B) Platinum black $O_2$ electrode; platinum black $H_2$ electrode—0.24 gm. of Pt each electrode
(C) Platinum black $O_2$ electrode; carbon—3% platinized (1 min.) platinum black $H_2$ electrode—after electrodeposition a total of 13.5 milligrams of platinum
(D) Platinum black $O_2$ electrode; carbon—3% platinized (3 min.) platinum black $H_2$ electrode—33.8 milligrams of platinum.

The results of this comparison are set forth in Table II hereinbelow.

TABLE II

| Electrodes: | Current density (ma./cm.$^2$) @ .7 volt [1] |
|---|---|
| A | 33 |
| B | 58 |
| C | 61 |
| D | 51 |

[1] Corrected for IR drop. (Voltage loss due to internal resistance of the cell.)

Table II hereinabove demonstrates substantially the same thing as Example 1: Minor amounts of platinum incorporated in the electrode are effective as hydrogen electrodes. However, electrodeposited platinum makes the electrode as effective as a platinum polytetrafluoroethylene electrode and there is an optimum amount of electrodeposited platinum.

Example 3

A series of electrodes were prepared having the following composition:

(A) Platinum black $O_2$ electrode on SS wire cloth—0.19 gm. platinum; platinum black (polytetrafluoroethylene binder) $H_2$ electrode—0.24 gm. of platinum
(B) Platinum black $O_2$ electrode; carbon—10% palladium $H_2$ electrode—16.7 milligrams of palladium
(C) Platinum black $O_2$ electrode; carbon—10% platinized (2 min.) palladium $H_2$ electrode—16.7 milligrams palladium, 20.4 milligrams platinum The current density of these electrodes at 0.7 volt is set forth in Table III hereinbelow.

TABLE III

| Electrodes: | Current density (ma./cm.$^2$) @ .7 volt [1] |
|---|---|
| A | 67 |
| B | 26 |
| C | 81 |

[1] Corrected for IR drop. (Voltage loss due to internal resistance of the cell.)

It will be seen from Table III above that the use of a hydrogen electrode of about 0.23 gram containing 10% palladium results in a much poorer performance. However, electrodeposition of 20.4 milligrams of platinum results in an electrode which performs as well as or better than a platinum electrode. It should be noted that palladium is approximately one fourth the price of platinum.

Example 4

An electrode (0.25 gm.) prepared by the procedure described earlier, containing graphitic carbon and 5% palladium was tested as a hydrogen electrode with a standard platinum black oxygen electrode (0.19 gm. platinum) resulting in current density represented by A in Table IV. The electrode was platinized for two minutes at 400 milliamps and the electrodeposited platinum on the outer surface was removed by rubbing with paper and also sanding. The electrode was replatinized for two minutes at 400 milliamps resulting in electrodeposition of 17.7 milligrams of platinum (total electrode weight after this treatment—0.21 gm.). This electrode was tested as a hydrogen electrode in a fuel cell with a current density at 0.7 volt given by B in Table IV. The platinum and some carbon was removed again by abrading both sides with sandpaper. This electrode was retested as a hydrogen electrode with results given by C in Table IV. The abraded electrode was analyzed by ultraviolet emission spectroscopy and found to contain 1.8% platinum, or a total of about 3.6 milligrams.

TABLE IV

| | Electrodes | Current Density (ma./cm.$^2$) at 0.7 Volt [1] |
|---|---|---|
| A | Standard platinum black O$_2$ electrode (0.19 gm. platinum); carbon (graphitic)—5% palladium (12.5 mgms. palladium) H$_2$ electrode (total wt., 0.25 gm.). | 23 |
| B | Standard platinum black O$_2$ electrode (0.19 gm. platinum); platinized carbon (graphitic)—5% palladium H$_2$ electrode (11 mgms. palladium; 17.7 mgms. electrodeposited platinum), total wt., 0.21 gm. | 55.2 |
| C | Standard platinum black O$_2$ electrode (0.19 gm. platinum); platinized, abraded carbon—5% palladium hydrogen electrode (10 mgms. palladium; 3.6 mgms. remaining electrodeposited platinum based on approximate total weight of 0.20 gm.). | 52.2 |

[1] Corrected for IR drop. (Voltage loss due to internal resistance of the cell.)

The results of Table IV show that electrodeposited platinum improves performance of a carbon-palladium (5%) electrode but the principal benefit is derived from a small amount of internally deposited platinum.

While the present invention has been described primarily in connection with hydrogen electrodes of the type employed in hydrogen-oxygen or hydrogen and air fuel cells, it is believed that the teaching of this invention is applicable to oxygen or air electrodes for use in similar devices.

We claim:

1. An electrode suited for use in fuel cells comprising a formed porous carbon mass having distributed therethrough a catalytic metal and a binder-waterproofing agent, and having electrodeposited on said waterproofed formed carbon mass, as a second catalyst, a platinum metal.

2. A formed electrode suited for use in fuel cells comprising carbon, a platinum metal and a waterproofing agent therefor and having electrodeposited on said waterproofed electrode, as a second catalyst, from .1% to 10% of the total weight of the electrode of a platinum metal.

3. A hydrogen-oxygen fuel cell comprising an electrolyte, a pair of electrodes containing carbon, a platinum metal, and a waterproofing agent therefor and on which, after waterproofing, a platinum metal has been electrodeposited as a second catalyst.

4. A hydrogen-oxygen fuel cell comprising an electrolyte, a pair of molded electrodes, at least one of which contains carbon, a platinum metal, and a waterproofing agent therefor, and on which after waterproofing a platinum metal has been electrodeposited as a second catalyst.

5. A fuel cell according to claim 4 in which the oxygen electrode contains carbon, a platinum metal, and a waterproofing agent therefor, and on which after waterproofing a platinum metal has been electrodeposited as a second catalyst.

6. A fuel cell according to claim 4 in which the hydrogen electrode contains carbon, a platinum metal, and a waterproofing agent therefor, and on which after waterproofing a platinum metal has been electrodeposited as a second catalyst.

7. A fuel cell according to claim 5, in which the metal is platinum.

8. A fuel cell according to claim 5 in which the carbon is electrolytic graphitic carbon, and in which the waterproofing agent is a polymer composed of polytetrafluoroethylene.

9. A fuel cell according to claim 5 in which the pair of electrodes contains carbon, a platinum metal, and a waterproofing agent therefor, and on which after waterproofing a platinum metal has been electrodeposited as a second catalyst.

10. A fuel cell according to claim 2 in which the electrode contains from .01% to 20% platinum based upon said total weight of the electrode.

11. A fuel cell according to claim 5 in which the electrode has incorporated, in addition to electrodeposited platinum metal, from .1 to 40% platinum based on the total weight of the electrode.

12. A process for preparing an electrode, comprising mixing carbon, a catalytic metal and a binder-waterproofing agent, forming a waterproofed electrode therefrom and electrodepositing a platinum metal on said electrode.

References Cited by the Examiner

UNITED STATES PATENTS

| 1,601,036 | 9/1926 | Nyberg | 136—121 |
| 2,384,463 | 9/1945 | Gunn et al. | 136—120 |
| 2,641,623 | 6/1953 | Winckler et al. | 136—122 |
| 2,782,180 | 2/1957 | Weidman | 136—122 |
| 3,071,637 | 1/1963 | Horn et al. | 136—122 |
| 3,098,772 | 7/1963 | Taschek | 136—122 |
| 3,113,048 | 12/1963 | Thompson | 136—122 |

JOHN H. MACK, *Primary Examiner.*